United States Patent
Friedl et al.

(10) Patent No.: US 8,944,308 B2
(45) Date of Patent: Feb. 3, 2015

(54) METHOD AND APPARATUS FOR PRODUCING MULTIPLE-PANE INSULATING GLASS HAVING A HIGH-VACUUM INSULATION

(75) Inventors: Wolfgang Friedl, Kaisheim (DE); Stephan Leitenmeier, Augsburg (DE)

(73) Assignee: Grenzebach Maschinenbau GmbH, Asbach-Bäumenheim (DE)

( * ) Notice: Subject to any disclaimer, the term of this patent is extended or adjusted under 35 U.S.C. 154(b) by 0 days.

(21) Appl. No.: 13/699,285

(22) PCT Filed: May 17, 2011

(86) PCT No.: PCT/DE2011/001080
§ 371 (c)(1),
(2), (4) Date: Jan. 18, 2013

(87) PCT Pub. No.: WO2011/144204
PCT Pub. Date: Nov. 24, 2011

(65) Prior Publication Data
US 2013/0140347 A1   Jun. 6, 2013

(30) Foreign Application Priority Data
May 21, 2010   (DE) .......................... 10 2010 021 127

(51) Int. Cl.
| | |
|---|---|
| B23K 1/06 | (2006.01) |
| B23K 101/18 | (2006.01) |
| E06B 3/673 | (2006.01) |
| C03C 27/08 | (2006.01) |
| E06B 3/66 | (2006.01) |
| E06B 3/663 | (2006.01) |
| E06B 3/677 | (2006.01) |
| F24J 2/50 | (2006.01) |

(52) U.S. Cl.
CPC .................. *E06B 3/673* (2013.01); *C03C 27/08* (2013.01); *E06B 3/6612* (2013.01); *E06B 3/66357* (2013.01); *E06B 3/67334* (2013.01); *E06B 3/677* (2013.01); *E06B 3/6775* (2013.01); *F24J 2/507* (2013.01); *E06B 3/66304* (2013.01); *Y02B 10/22* (2013.01); *Y02B 80/24* (2013.01); *Y02E 10/40* (2013.01)
USPC ...... 228/111.5; 228/110.1; 228/1.1; 156/109; 428/34

(58) Field of Classification Search
CPC .................. B23K 1/0008; E06B 3/66–3/6617
USPC .......... 228/1.1, 110.1, 111.5; 428/34; 156/109
See application file for complete search history.

(56) References Cited

U.S. PATENT DOCUMENTS

| | | | | |
|---|---|---|---|---|
| 3,908,886 | A * | 9/1975 | Raske | 228/1.1 |
| 5,173,148 | A * | 12/1992 | Lisec | 156/578 |
| 7,832,177 | B2 * | 11/2010 | Stark | 52/788.1 |
| 2008/0245011 | A1* | 10/2008 | Friedl | 52/407.5 |
| 2009/0074997 | A1* | 3/2009 | Stark | 428/34 |
| 2009/0151853 | A1* | 6/2009 | Cooper | 156/104 |

* cited by examiner

*Primary Examiner* — Devang R Patel
(74) *Attorney, Agent, or Firm* — Brinks Gilson & Lione

(57) ABSTRACT

An apparatus and method for producing an insulating structural element from substrates is provided. The substrates may be connected to one another at a periphery by applied pieces and may be insulated from one another by a vacuum. The apparatus may include a washing device, a cleaning device, a heating device for pre-heating the substrates, a positioning device for positioning the applied pieces on the substrates, an ultrasonic soldering device for soldering the applied pieces to the substrates, an automatic spacer and getter element setting unit, a plasma sputtering device in a vacuum, a substrate displacing device for transporting the substrates, a mechanical substrate placing device for joining the substrates, and a connecting device for welding or soldering the applied pieces of the substrates to each other.

18 Claims, 14 Drawing Sheets

METHOD AND APPARATUS FOR PRODUCING MULTIPLE-PANE INSULATING GLASS HAVING A HIGH-VACUUM INSULATION

CROSS REFERENCE TO RELATED APPLICATIONS

This application is a national stage application under 35 U.S.C. 371 of international application number PCT/DE2011/001080 filed May 17, 2011 (WO 2011/144204 A3) and also claims priority to German application number 10 2010 021 127.3 filed May 21, 2010, all of which are hereby incorporated by reference in their entirety.

SUMMARY

The present invention relates to a method and an apparatus for producing multiple-pane insulating glass having a high-vacuum insulation, known as vacuum insulating glass or VIG.

This normally involves joining together two or more parallel-aligned sheets of glass, which together form a thermally insulating glass surface, for example on structures, vehicles, cooling or refrigerating and heating appliances or consumer goods. In another case, a sheet of glass is joined together with a frame of sheet metal to produce a solar thermal module. However, differently formed components that require sheets of glass to be joined together with other materials in a vacuum-tight manner are also conceivable.

In building biology, the surface of a house, that is to say the entire outer area that provides protection from the elements, is referred to as man's third skin, normal clothing being regarded as the second skin. The parts of the surface of a house that are not made light-permeable, can be insulated relatively easily and inexpensively to the extent that only a negligible heat loss can be observed. The situation is quite different, however, where the windows of a house are concerned. Here, apart from the normal light permeability, additional thermal insulation is required.

The thermal insulation regulation EN2012, coming into force in 2012, requires a thermal insulation of the windows that can only be achieved either by using a conventional triple insulating glass pane or by means of VIG panes.

A great problem with these VIG panes is the production of a bordering bond that is stable over a long period of time and provides a tight seal with respect to a high vacuum. The glass-glass connection by means of a glass solder that has been used in practice up until now for vacuum insulating glass is not considered here, since this bordering bond is rigid, and it is consequently not possible with these previous methods to achieve relatively great geometrical dimensions of the panes and at the same time good thermal insulation values.

It is aimed to achieve a glass-metal-glass connection, since these two materials make it possible to obtain a flexible gas-tight bond that is suitable for high vacuums. Methods that can in principle be used for producing such glass-metal connections are, for example, ultrasonic welding, ultrasonic soldering, various possible ways of producing a pressure-diffusion connection or the use of glass and metal solders in combination with coatings on the glass and/or the metal.

Although mechanically stable glass-metal connections can be achieved by means of ultrasonic welding, process reliability is problematic with this method, especially in the case of connections over lengths several meters long. On account of the inhomogeneous heating and/or different coefficients of thermal expansion, a different thermal expansion of glass and metal occurs when energy is introduced in the ultrasonic welding process. This consequently causes thermomechanical stresses, which in the case of relatively long welds may lead to instances of damage to the glass surface and consequently to leakages. The use of soft metals has a favorable effect in the case of the ultrasonic welding process and reduces the thermal stresses occurring in the joining operation. However, soft metals can only be welded with lower energy. This leads to reduced adherence to the glass, so that this also does not allow (high) vacuum-tight connections to be produced with adequate reliability of the process.

The known pressure-diffusion methods require great expenditure in terms of process engineering, and also very high glass temperatures over a relatively long time period. It is consequently not possible to use either effective glass coatings to reduce the transmission of thermal radiation ("soft coatings") or tempered panes (toughened safety glass) and/or laminated glass (multilayer safety glass).

When using glass or metal solders, before the soldering an intermediate layer or coating must first be applied to the glass pane and/or to the metal as bonding agents of the glass-metal connection to achieve a gas-tight wetting, since fluxes cannot be used in the area of high-vacuum applications because of their unavoidable outgassing. The bonding agents are subsequently placed one on top of the other with the solder in between and soldered under the influence of pressure and temperature. However, a relatively complex technical procedure is necessary for this, in order on the one hand to apply the necessary heat uniformly over the entire surface, and consequently introduce it without the glass being stressed, and on the other hand to apply the pressing pressure homogeneously. It is also necessary to avoid oxidations on the surfaces of the materials involved, in particular on metals and in the solder due to the vacuum or shielding-gas atmosphere, etc. By alloying with rare earths, metals and semimetals, on the one hand the melting temperature of the solder can be lowered significantly; on the other hand the wetting capability is increased by such an active solder, which facilitates the formation of vacuum-tight glass-metal connections. However, such admixtures are in some cases very expensive and it is also often questionable with regard to sustainability how long globally scarce resources will allow the use of mass products such as insulating glass windows.

The method of ultrasonic soldering according to the invention allows in principle both glass and metals to be wetted very well. The introduction of the ultrasound 5 into the solder has the effect of destroying oxides or oxide skins or layers that form on the surface of solder and glass and hinder the soldering operation. The ultrasonic energy thereby presses the solder into even the smallest cavities, which otherwise would not 10 be accessible and could form possible leakages. Ultrasonic soldering can also be performed using active solder. A further alternative is that of ultrasonic soldering with additional coating. By such measures, the processability is further improved.

EP 1 978 199 AI, as the closest prior art, discloses a vacuum insulating glass structural element and a method and apparatus for the production thereof. This method is based on the object of providing VIG structural elements which on the one hand achieve much better thermal insulating values than good two-pane insulating glass and on the other hand only require production expenditure that is at least not significantly above that of a good two-pane insulating glass. Furthermore, the VIG structural elements are intended to be able to absorb the thermomechanical stresses that occur during use due to different temperatures of the two individual panes considerably better than conventional VIG, and consequently achieve a reliable long-term lifetime.

This object is achieved by a vacuum insulating glass structural element having a first glass pane and a second glass pane, which are supported against one another by way of spacer elements and enclose between them a thin evacuated intermediate space, and are sealed at their borders by a vacuum-tight bordering bond. This structural element is characterized in that the bordering bond is produced from metal foil strips, of which first metal foil strips are connected to the borders of the first sheet of glass in a vacuum-tight manner and second metal foil strips are connected to the borders of the second sheet of glass in a vacuum-tight manner and the regions of the first and second metal foil strips that protrude beyond the bordering edges of the respective sheet of glass are welded to one another.

Claimed in this document as a method for producing such a structural element is that the prepared glass panes with the metal foil strips attached thereto are introduced into a vacuum chamber and placed one on top of the other in the chamber, the welding of the metal foil strips taking place within a vacuum chamber by means of a laser beam which is generated outside the vacuum chamber, introduced into the vacuum chamber through linearly extending windows and moved substantially along the metal foil strips. However, this known method, and the corresponding apparatus, have not so far made it possible to achieve a satisfactory result, since the glass-metal connection has been achieved there either by ultrasonic welding or by glass-solder soldering, and therefore the disadvantages described above have occurred. Moreover, some of the details that are important for the overall process of VIG production have not been dealt with or taken into consideration there.

The present invention is therefore based on the object of providing a flat vacuum-insulating structural element having an enclosed high vacuum, with which industrial production can be realized even in cases of large geometrical dimensions in a reliable process with low expenditure in terms of energy and cost, the long term stability of the enclosed high vacuum and the breaking resistance of the structural element being ensured.

This object is achieved by an apparatus according to claim 1, and a method according to claim 15.

The apparatus according to the invention is described in more detail below.

Specifically:

DETAILED DESCRIPTION

The basic concept of the present invention is based on the use of a glass-metal soldering device with ultrasonic assistance and that a special structuring of a bonding agent facilitates the introduction of the ultrasonic energy that is used, in such a way that it reaches the solder lying thereunder to a sufficient extent. As illustrated below by examples in FIG. 14, this structuring divides the bonding agent concerned into smaller portions 17. In this case, these are the metal strips 7, which lie on top of the glass pane 1 as an applied piece between the glass pane 1 and the ultrasonic source (ultrasonic soldering iron 12). The natural frequency of these smaller portions 17 is formed thereby in such a way that they are induced to oscillate by the introduction of an ultrasonic signal, also with low energy, and this oscillation can be passed on to the solder. To achieve an optimum energy transmission, the natural frequency of these portions is preferable chosen such that it is in resonance with the excitation frequency or the harmonic thereof of the ultrasonic signal. In a preferred embodiment, these portions may also be chosen such that their main dimensions resonate with the excitation frequency of the ultrasonic signal and micro-lamellae additionally structured on them resonate with the harmonic of the excitation frequency.

By this choice of the structuring, it is even possible to apply the solder through the bonding agent located on top. In this way, it is no longer necessary to introduce the solder beforehand between the bonding agents, but instead the solder is to a certain extent sucked over the limits of the portions of the structured bonding agent lying on top, by means of the soldering gaps offered in such a way, into the intermediate space between the two bonding agents, that is to say for example here the glass and the metal. The connection of the two bonding agents that is produced in this way is gas-tight. Therefore, the solder can also be introduced for example by way of the tip of an ultrasonic soldering iron.

Figure 1:
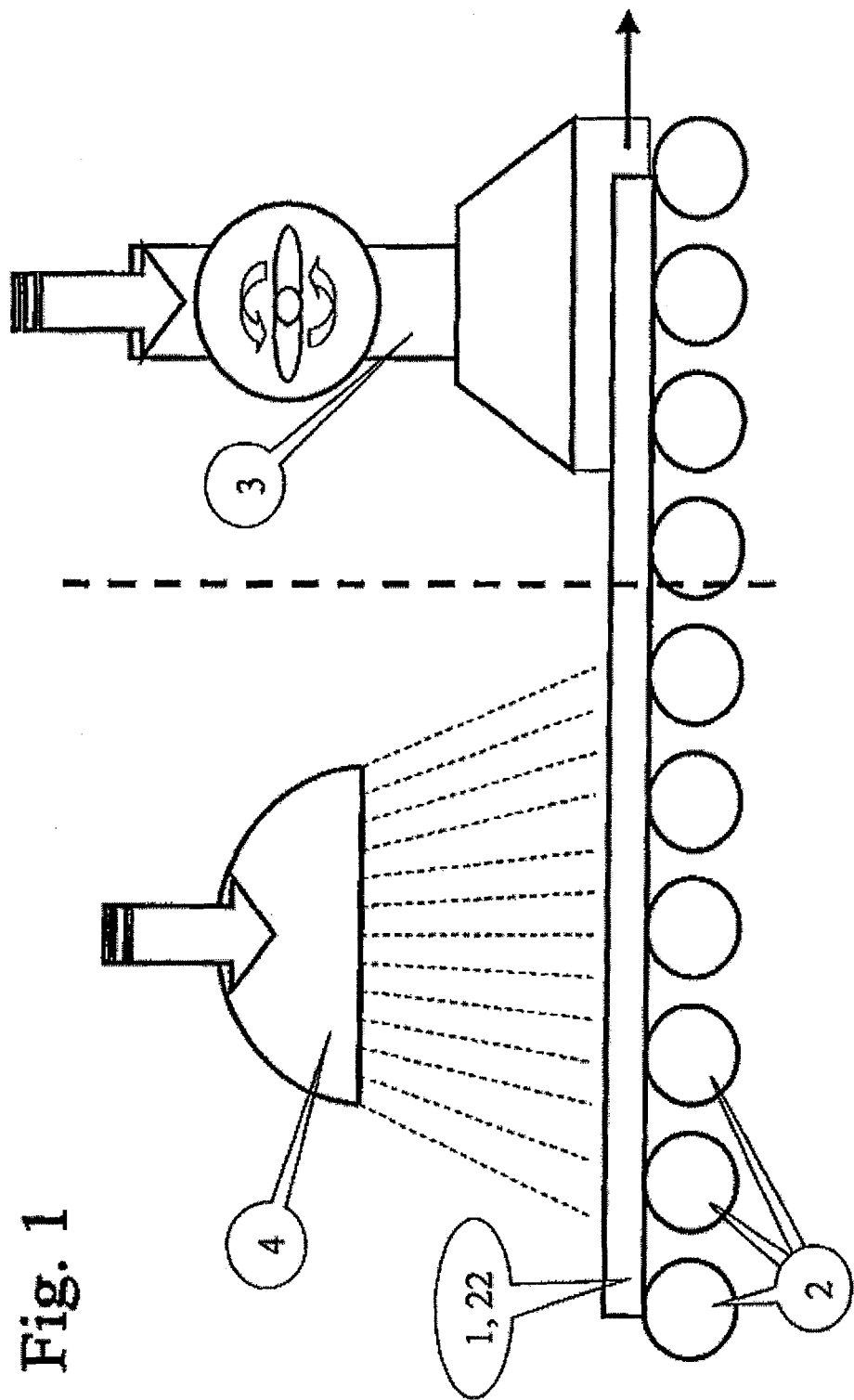
FIG. 1 shows a washing device and a drying device for a glass pane.

Of the apparatus according to the invention, in FIG. 1 a washing device 4 for a glass pane 1 and a subsequent drying device 3 are represented in cross section. The glass pane 1 is thereby transported by a transporting device 2, for example out of a store that is not represented, into the production process on rollers in a way corresponding to the direction of the arrow shown. The glass panes 1 lying in the store are cut to their intended size at the edges. It is advantageous in this respect for the glass to be cut to size by a laser, since this measure improves the breaking resistance of these glass panes 1 by avoiding microcracks. The glass pane 1 first runs through the sketched washing device 4, to then arrive in the drying device 3 after passing through an intermediate region. The thermal energy contained in the warm washing water is thereby stored in the glass and used to improve the energy balance of the overall production process. The devices are represented schematically. Thus, the dividing line inserted perpendicularly in FIG. 1 may in practice correspond to a greater spatial distance between the washing device 1 and the drying device 3. The transporting device 2 may act by means of rollers, wheels, belts, carriages, webs or other transporting means. The washing device 4 may be constructed on the basis of spraying, brushing or sponge-wiping in a way corresponding to the prior art for glass-pane washing machines. After leaving the drying device, the glass pane 1 is preheated.

Figure 2:
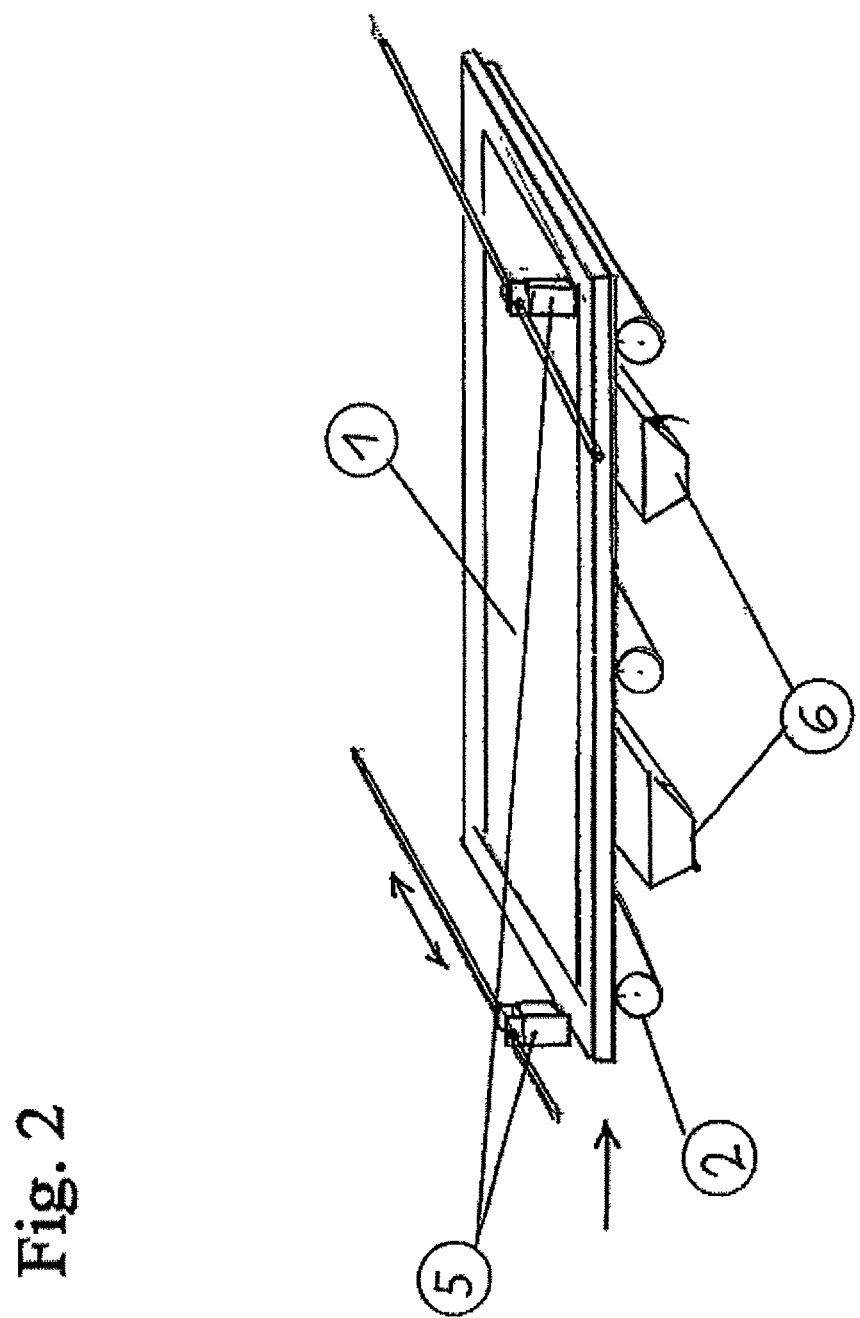
FIG. 2 shows a heating device for a glass pane.

In FIG. 2, a heating device for a glass pane 1 cleaned as shown in FIG. 1 is represented perspectively. Apart from the known transporting device 2, represented in the bordering region of the glass pane 1 is a heater 5, which can be directed and/or moved in a way corresponding to the geometry of the glass pane 1. The direction of the transport of the glass pane 1 is from left to right. In the central region of the heating device there are two main heaters 6, which together with the border heaters 5 make heating of the glass pane 1 possible. The number and size of the main heaters are based on the total length of the respective glass pane 1.

The heating devices may be arranged on both sides, for example in the case of a horizontal construction of the heating device underneath and/or above the glass pane 1. Both heaters 5, 6 acting in a two-dimensional manner, such as heating plates, infrared emitters, fan heaters, etc., and heaters 5, 6 acting in a directed manner, for example infrared emitters, a laser beam or microwave, are provided. The combination of these different heating devices, which are constructed at different locations and act differently on the glass pane, achieves the effect that the border of the pane that is to be soldered in the subsequent step is heated to the basic temperature required for the soldering process, while the inner region of the pane is heated in the dimensions defined and only to the extent that the temporary temperature differences, and the consequently produced temporary tensile and compressive stresses, in the glass pane 1 do not lead to breaking of the pane. When setting the inner pane temperature, care is taken that a maximum temperature difference of approximately 80° C. between the hot border of the pane (about 200° C.) and the inner region of the glass pane 1 is not exceeded. At the same time, the different cooling of the pane toward the border and toward the corners must be counteracted.

A major advantage of this modeled heating, as a result of the lower temperatures of the surfaces of the panes, is also the saving of heating and cooling energy in the production of the structural elements.

Among other factors, the required basic temperature depends in this case on the duration between the heating and the soldering process, the solder that is used and the specific parameters of the soldering process.

Figure 3:
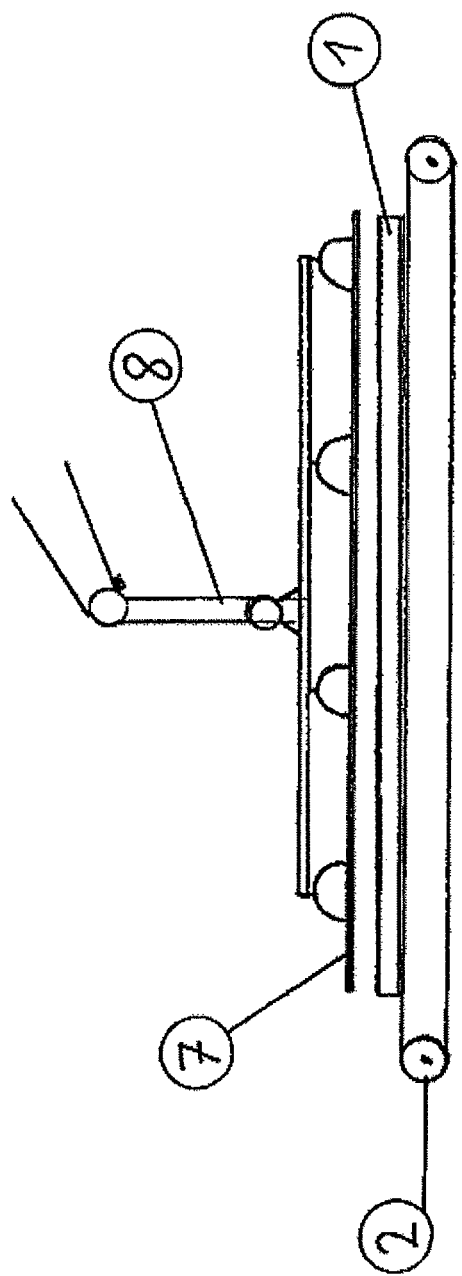
FIG. 3 shows a placing device for metal strips.

FIG. 3 shows a placing device for metal strips, which are later connected to the glass pane 1 in a vacuum-tight manner. The placing-positioning device 8 may thereby pick up the metal strips 7 concerned, for example by means of suction cups or magnets, from a corresponding storage location, bring them into the desired position and set them down there, and thus fix them in such a way that about 10 mm of the metal strip still rests on the border of the pane and about 30 mm protrudes outwardly beyond the pane. This is symbolized by means of the represented articulated connections of the placing-positioning device 8. The transporting device 2 is depicted here for example as a conveyor belt.

A further possible way of providing the strips is to unwind them from a roll, cut them to length and thereby place them onto the border of the glass.

As an alternative to metal strips, a finished metal mount may in the same way also be placed on each edge of the pane. This mount may be produced by joining four sheet-metal strips together in advance or by cutting it out from a sheet-metal plate.

This placement of the sealing strips 7 or the mount may be additionally accompanied by fixing of the sealing strips on the glass pane next to or along the later soldering line by a heat-resistant adhesive bonding technique, the adhesive being provided on the outer side, toward the border of the pane, for reasons of outgassing, and the soldered sealing then being provided on the inner side, facing the vacuum filling.

Figure 4:
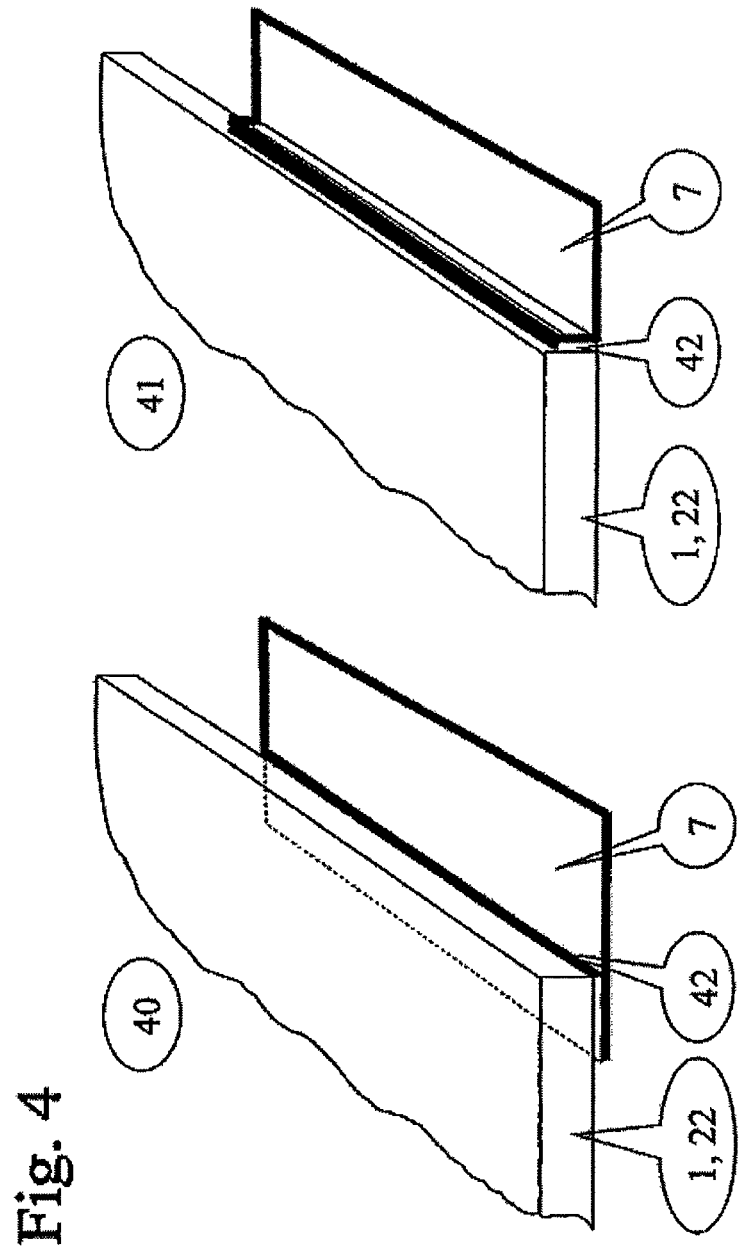
FIG. 4 shows the arrangement of the metal strips on the glass.

As represented in FIG. 4, a further possibility is that the metal strips 7 are not soldered onto the upper side 1 of the glass pane at the outer border, as depicted in 40 (seen from below), but instead the soldered connection 42 is made laterally against the edge of the glass pane 1, as represented in 41. The sheet-metal strip 7 is then bent around outwardly, flush with the surface of the pane.

Suitable as a material for the metal strips or for the mount are all materials that are sufficiently flexible, gas-tight and suitable for high vacuums, including many metals: usually chosen is an iron-nickel alloy, which is adapted in the coefficient of expansion to the glass that is used for producing the glass pane 1. However, a metal that is less adapted thermally may also be used, as long as it is sufficiently soft or can be soft-annealed, for example steel, high-grade steel, aluminum, copper, tin sheet (tin foil), tin plate, lead, etc. and alloys thereof.

Also suitable as a material for the glass pane 1 and also 22 is a glass that can withstand temperatures of 200 degrees Celsius without damage for several minutes. In other words, normal window glass or soda-lime glass is possible as well as borosilicate glass, single-pane tempered safety glass (toughened safety glass), laminated multilayer safety glass, chemically hardened glass and also many functional types of glass and switchable types of glass. Coated types of glass, the coatings of which are resistant to 200 degrees Celsius, are also suitable, and are also intended in the case of all the types of pane described above for VIG, in order to achieve good thermal insulating values.

Also intended here are combinations adapted to the planned use of the VIG unit, for example an inner pane of multilayer safety glass and an outer pane of toughened safety glass, for example for glazing units on roofs.

Figure 5:
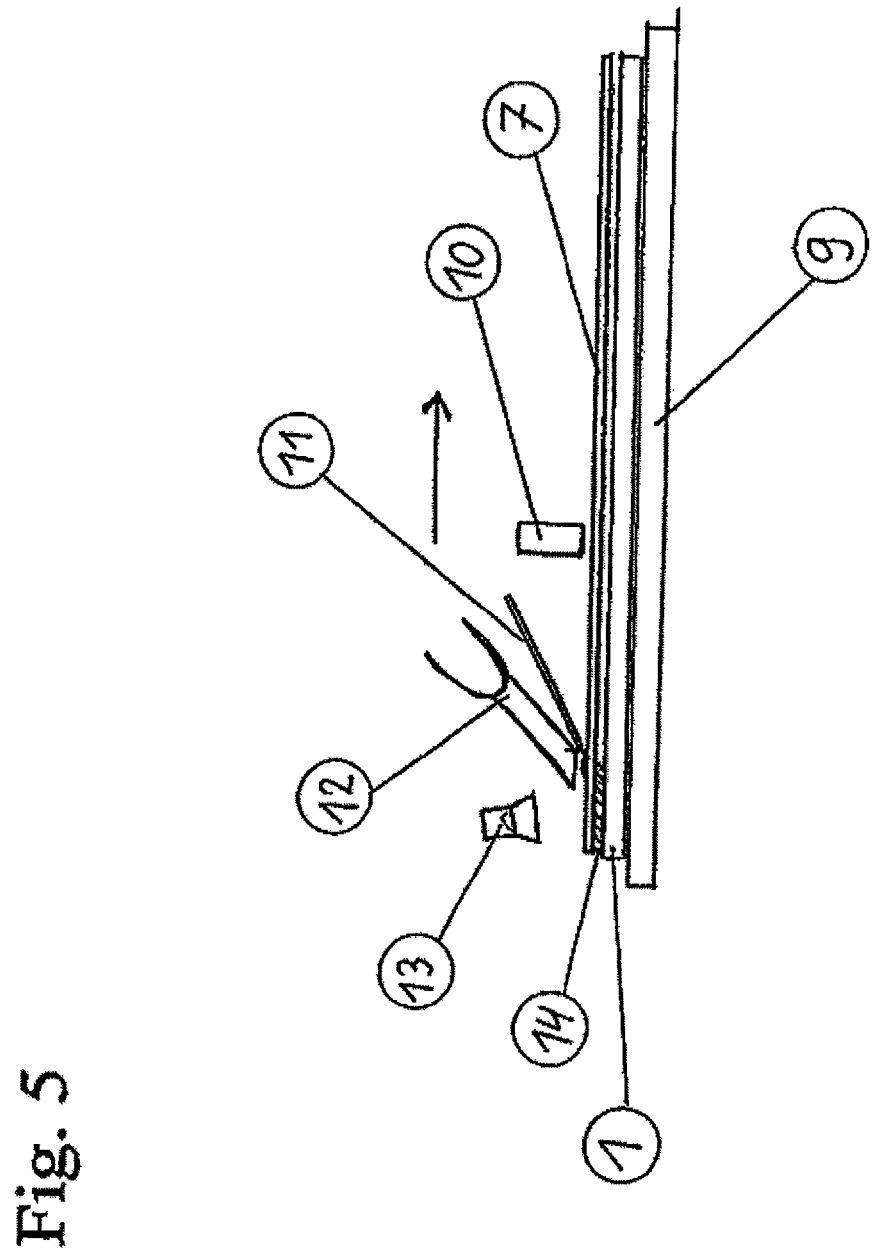
FIG. 5 shows an ultrasonic soldering device (soldering iron)

It must be noted that the procedure according to the invention is suitable not only for the production of planar and rectangular vacuum insulating glass panes: with a slight modification corresponding to the prior art, in particular of the transporting devices and the positioning devices, panes of any desired geometries can be made into VIGs. This can be carried out both in the case of planar glass and in the case of already pre-bent pairs of panes. This satisfies the requirements for angular windows, arched windows, portholes and any desired glazing units for vehicles, etc. For the sake of overall clarity, however, planar and rectangular panes are assumed in the present description of the procedure. In FIG. 5, an ultrasonic soldering device using an ultrasonic soldering iron 12 is represented in cross section. The heated tip of the soldering iron 12 represents the sonotrode for introducing the sound waves into the applied solder 14. The soldering iron 12 is moved in relation to the glass pane 1 in the direction of the arrow along the bonding line at the border of the pane 1, on or against the sheet-metal strip 7 held by means of a fixing device not depicted, with typical soldering movements, for example touching at looping intervals, for example guided by a robot not depicted, or the glass pane is transported in the opposite direction under the stationary soldering iron. The glass pane 1 concerned lies here on a corresponding working support 9. A heating device 10, represented in cross section, serves from above and/or below for additionally heating the region of the glass pane 1 onto which the metal strip 7 concerned is being soldered. In addition, the heating device 10 serves from above for smoothing the soldered seam, in order to minimize the build-up thickness. The heating device 10 may also comprise downstream heating and cooling registers, in order to be able to control the timing of the cooling of the glass 1 and the metal strip 7 after the soldering in order to avoid high stresses. By means of the solder supplying device 11, the respectively required amount of solder 14 is supplied. This solder is already preheated to processing temperature in the supplying device 11. The solder supplying device 11 may also be integrated in the soldering iron. With the aid of a sensor device 13, the soldering operation is monitored. This may take place optically and/or in an automated manner, it being possible for electronic pattern recognition to be used.

Figure 6:
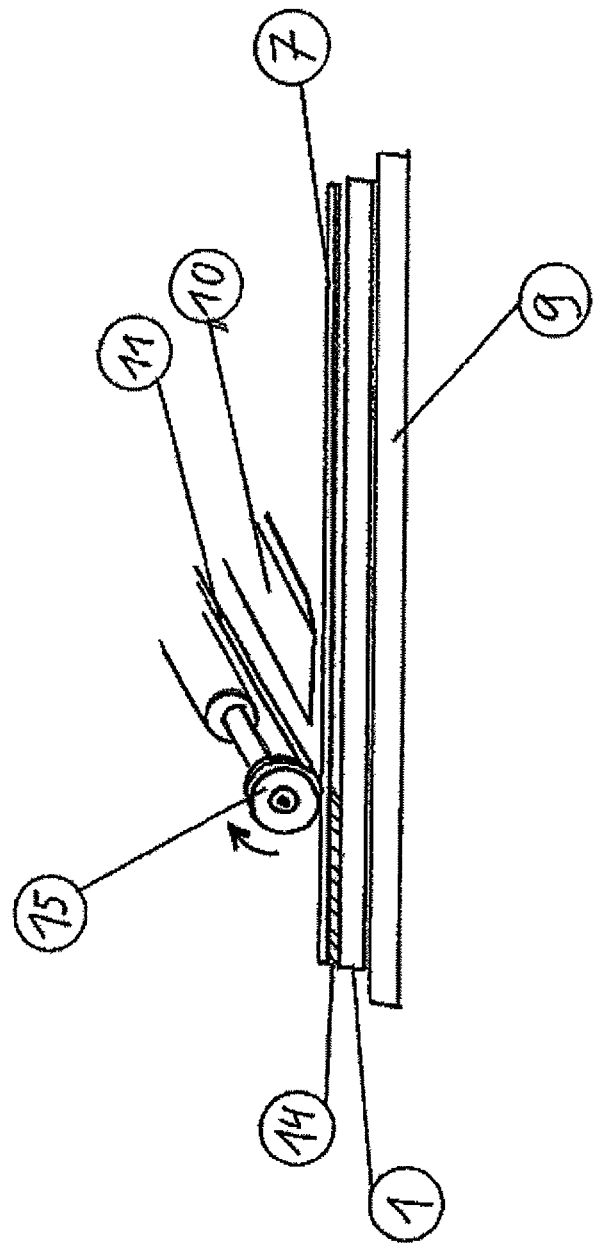
FIG. 6 shows a soldering device with an ultrasonic soldering wheel.

FIG. 6 shows an alternative soldering device with a soldering wheel 15. The heated soldering wheel 15, formed as a sonotrode, is represented here in a slightly perspective manner, in a way corresponding to the heating device 10 of an adapted configuration for the soldering and smoothing operation. The other details correspond to the representation in FIG. 5.

Figure 7:
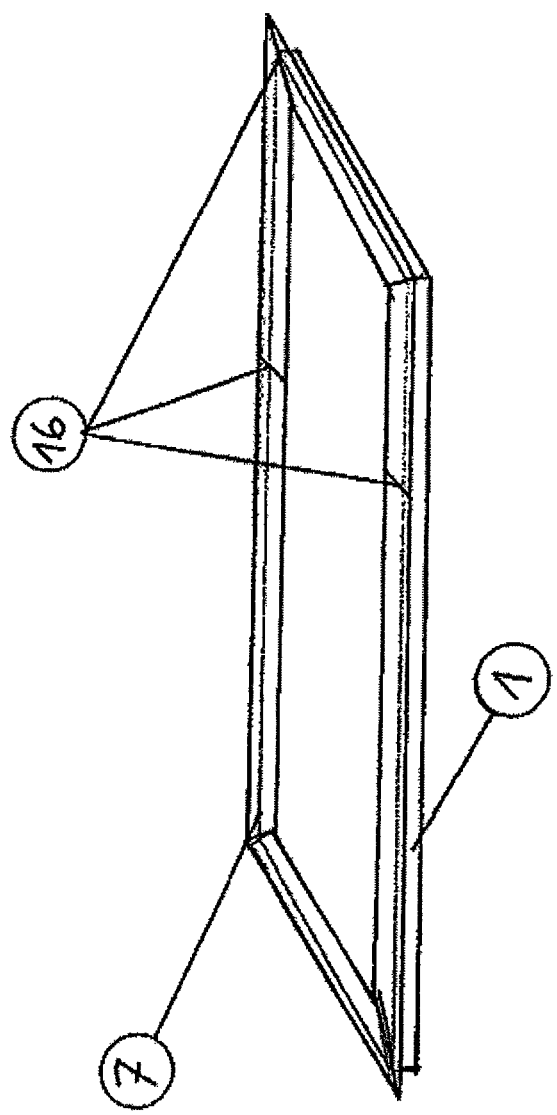
FIG. 7 shows a glass pane with metal sealing strips soldered on top

In FIG. 7, a glass pane 1 with its metal sealing strips 7 soldered on all around can be seen. In the corner regions and at separating points, which may occur in particular in the case of glass panes with a large spatial extent, corresponding soldering joints 16 are denoted. Consequently, the metal strips 7 have been turned into a metal frame or metal-foil mount. Instead of by soldering, the soldering joints 16 may also be connected by some other metal-metal connection suitable for vacuums, for example welding, depending on the material of the sealing strips 7 and depending on the connecting technique used in the vacuum chamber, laser welding 24 or soldering.

It is alternatively possible to prepare in advance a finished metal mount or a metal mount that is only open on one side, which is then soldered all around onto the glass pane by analogy with the above description. This then dispenses entirely or partially with the soldering joints 16.

In the sequence from FIG. 1 to FIG. 6, the soldering of the metal mount or frame comprising the metal strips 7 onto the lower glass pane 1 is described. In the same way, the upper glass pane 22 is then provided with a metal frame.

In the next step, spacers 15 are placed onto the lower glass pane 1 framed with the metal frame. These spacers, also known as supports, ensure that the intermediate space of the VIG pane, which is void of air, is not compressed by the external air pressure.

Figure 8:
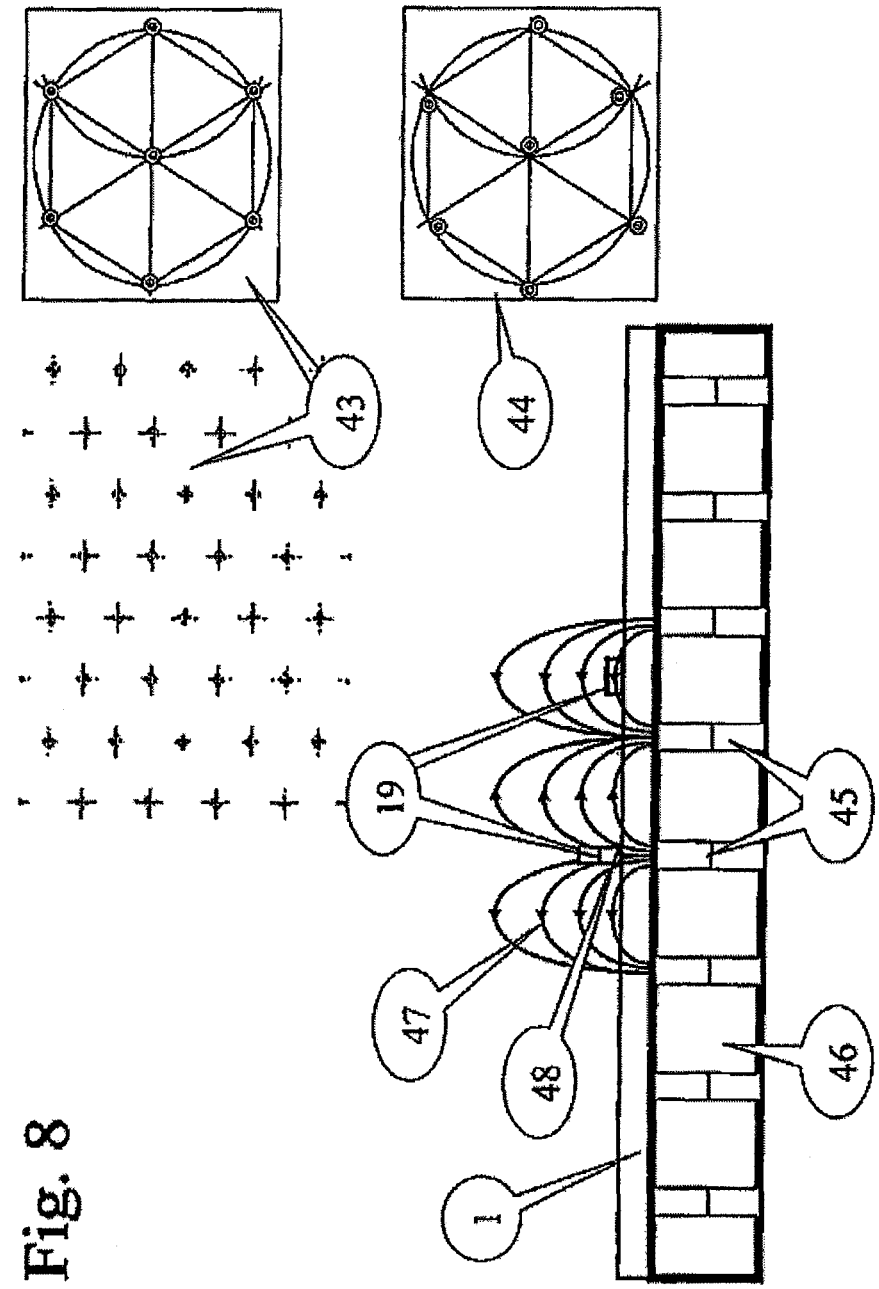
FIG. 8 shows the pattern of the supports and the function of the shuttle plate.
Figure 9:
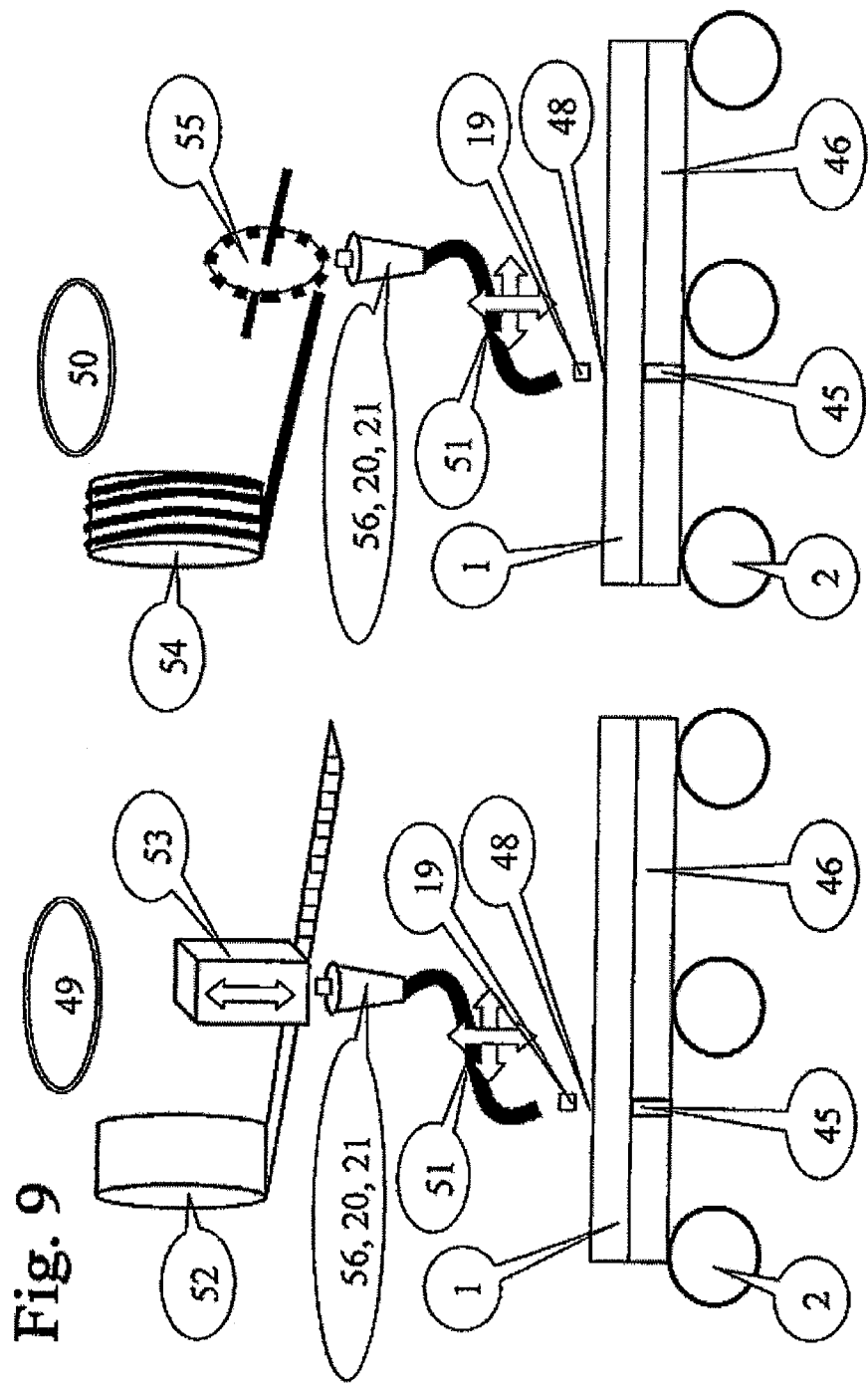
FIG. 9 shows two variants of the placing device for spacers.

The spacers 19 shown in FIG. 8 and FIG. 9 are, for example, cylinders, hollow cylinders, cuboids, prisms, pyramids, pyramid frustums, spheres, half-spheres of metal, graphite, glass or ceramic. Also complex composite forms and/or materials are conceivable for the spacers 19. The spacers 19 may have magnetic properties intrinsically or as a result of special treatment. The spacers 19 are placed onto the glass surface in a defined pattern or grid.

In the case of glass about 4 mm thick, the height of the spacers 19 is about 0.7 mm, the diameter about 0.5 mm, the grid spacing about 30 mm, so that about 1000 spacers 19 per square meter should be placed. These dimensions may vary greatly, depending on the thickness of the glass or else with respect to individual requirements for the visibility of the spacers 19: thus, for example, thicker spacers may also be used with a greater spacing or thinner spacers with a closer grid.

For the sake of simplicity, a two-dimensional square grating or grid is defined as the pattern for vacuum insulating glass panes presented earlier.

As represented in FIG. 8, according to the invention a new pattern 43 in the form of a two-dimensional hexagonal grating is preferred here. The grating may also be compressed or extended along one or both principal axes, in order to achieve an adaptation to the dimensions of the pane. Moreover, as shown in 44, the positions of the individual supports around the grating positions may optionally be varied according to choice in a random or defined manner. Firstly, such a pattern produces the optimum load distribution of the spacers 19 for the glass panes. Secondly, an incredibly reduced visibility is achieved, since periodicities of the setting pattern in the form of continuous straight lines in the rows of supports then become much less perceptible, especially in comparison with the simple rectangular pattern. Thirdly, the periodicity of the underlying grating is broken by variations, i.e. there is no mathematically regular repetition of the grid, but instead the spacings or the sides of the triangles of the grid are deliberately varied. This prevents resonantly determined sound frequencies from being transmitted with preference through the pane during the sound transmission.

New ways are also used for fixing the spacers 19, as is represented in FIG. 8. While in the case of earlier solutions the spacers 19 were fixed on a pane by an adhesive, such as for example sodium silicate, here it is possible to dispense with the use of adhesive: during the entire production of the VIG pane, the position of the lower glass pane 1 remains fixedly connected to a plate or a shuttle 46. Let into this plate 46 are fixing elements 45, exactly in the pattern 44 corresponding to which the spacers 19 are to be set onto the glass pane 1. These fixing elements 45 may be, for example, bar magnets (for example NdFeB, SmCo or ferrite) or electromagnets, but other elements that produce a homogeneous or inhomogeneous magnetic or electrical field, etc., and thus act on the spacers 19 through the glass pane 1 by the effect of an attractive or repulsive force, are also possible.

The spacers 19 used here in the example are produced from magnetic or magnetizable material (ferromagnets, antiferromagnets or ferrimagnets); the fixing elements 45 are axially magnetized cylindrical bar magnets.

By suitable design of the generally inhomogeneous magnetic field 47 by means of a defined arrangement of the fixing elements 45, in addition to the fixing of the spacers 19 there is also a correct alignment and centering at the intended position 48. If, for example, a magnetic columnar spacer 19 with magnetic anisotropy, caused for example by a sufficiently great length in comparison with the diameter (shape anisotropy), is brought to within about 10 mm of an intended position 48 on the sheet of glass 1 in any desired spatial orientation, vertically or horizontally, this spacer 19 is drawn to the intended position 48 and stands up perpendicularly on the sheet of glass 1 over the intended position 48 of the fixing element 45. The fixing element 45 consists of a bar magnet 45 inserted into the shuttle plate 46 on the underside of the sheet of glass 1. Therefore, only a relatively inaccurate XY positioning device is required, with which the spacers 19 are distributed simultaneously or in quick succession among the support positions 48. For this purpose, a mechanical, electrostatic, magnetic or pneumatic gripper may be used, or the spacers 19 may slip through a positionable hose or a tube, or the supports are allowed to fall in a distributed manner through a perforated plate. This distribution, described as the only distribution here, can also be optimized to increase the cycle time by group formation; in that case, for example, a complete row is always prepared and then set together.

After completion of the VIG pane, the spacers 19 in the vacuum are firmly clamped and fixed between the two glass panes 1 and 22 of the vacuum element by the external air pressure—at which time the shuttle plate 46 with the bar magnets 45 can then be removed without the spacers slipping.

The advantage of this method lies not only in the amazing simplicity, allowing about 1000 spacers to be set per square meter in a high cycle time, but also in the further reduction in the visibility of the spacers 19 as a result of the adhesive then no longer being needed.

New ways have in turn been used for supplying the spacers, see FIG. 9. While the previous solutions individually take previously ready-made spacers 19 as spheres, cylinders, disks, springs or rings of ceramic and/or metal from a stock of material and then feed them into the support setter, here the spacers 19 are produced in step with the cycle time of the automatic setting unit 51:

In variant 1, see 49, the supports 19 are punched out from a support-material metal strip 52, supplied from a roll, by a tool, for example punch 53. Directly from the punch 53, the supports 19 then fall for example through X/Y-positioned hoses 51 to the setting-up location 48 over the fixing element 45.

In variant 2, see 50, the supports 19 are cut to length a wire 54 supplied from a roll, for example by a saw or a cut-off wheel 51, and then likewise individually positioned further 51 with respect to the setting-up location 48.

Also provided is the alternative of realizing the production of the spacers from the stock of material by 35 means of a suitable laser system for separating or cutting materials. This is advantageous in particular in the case of complex geometries of the spacers.

Further new ways are used with respect to the material of the supports. Here there are a series of requirements that often favour contrasting measures:

As a first requirement, with the chosen setting technique the spacer 19 must in any event be magnetic or magnetizable or electrically chargeable, etc., see the description above.

The second requirement is suitability for a high vacuum without significant outgassing over several decades.

This largely rules out plastics for example.

The third requirement concerns the thermal conductivity of the material of the supports. This is decisive for the U value of the finished vacuum insulating glass pane. Depending on the supports used, the U value of the glass will vary between 0.3 and 0.7 W per square meter and degree Kelvin. Metallic supports are disadvantageous here, since metals generally have high thermal conductivity values.

The fourth requirement concerns the hardness of the material:

the supports should be softer than the glass surface, since otherwise the glass surface is damaged on the inside by the support under external shock loading, for example hailstones, which may lead to consequential damage, even to the extent that the glass breaks. This rules out, for example, supports made of glass. Inventions where resilient elements, for example spring rings, are added to the supports to neutralize this effect are also known.

The fifth requirement concerns the color of the supports with respect to visibility. Dark supports are scarcely visible in the window when there is a dark background, for example in the case of trees, but visible for example when there is a bright white clouded sky. Bright supports behave precisely oppositely in this respect. Transparent glass supports perform better against any background, but light impinging from the side makes them shine conspicuously brightly. For the same reason, reflective surfaces of any color should be avoided.

However, increased visibility of the supports may also be desired, if they are used for advertising purposes, in order for example to integrate a logo in the window. This then takes place, for example, by special shaping, arrangement and coloring of the supports.

A further important requirement for the supports is the contact area with respect to the glass panes. By varying the material and structure of this usually circular contact area it is possible to influence both the friction between the support and the glass and at the same time the size of the contact area that is effective for the heat transfer, which influences the U value considerably. Optimizing friction between the support and the glass decides by how much the panes move in relation to one another when there is a difference in temperature between the inner pane and the outer pane, or conversely the forces of expansion are instead consumed as stress by subjecting each individual hexagonal zone of the supports to strain.

To resolve this or achieve a compromise in respect of these requirements, this invention uses combined materials for the spacers 19, the surface color and structure then only being additionally adapted chemically by removal or physically by profiling the bearing surface or by applying a bonding coating before the positioning in a device.

Specifically, in the case of a first variant (49), punching out of the supports from a metal strip, a multilayer plated metal strip 52, is used, where the materials are adapted optimally to the tasks. In the case of the layers facing the glass pane 1, for example, soft metal sheets which are additionally mechanically structured on the surface that comes to bear against the glass are used. In the middle layers of the support 19, thermally insulating materials are incorporated. The cylinder casing/visible side is made mat, for example by acid, in the device 56.

In the case of a second variant (50), cut-to-length wire is used, for example an FeCu wire with a steel core and a soft copper sheathing. Here, too, additional mechanical structuring is provided on the surface that comes to bear against the glass 1 and the cylinder surface is made mat, for example by an alkaline solution.

A further variant, based on the first or second variant, is that of using a sintered or pressed semifinished product, which for example consists of grains of various materials, also using embedded plastic.

In the case of all the variants, getter metal may be additionally added to the material of the supports, or the supports may be coated with getter material.

However, a special getter support, the material of which is optimized for the residual contaminants still remaining later in the vacuum between the panes and can absorb them after activation, is used with preference as the outermost row of supports around the border. In this way, the vacuum in the VIG pane is stabilized over a long time. In addition, getters in some other form may also be introduced into the intermediate space between the panes.

These spacers 19, described together, are used in particular when a vacuum insulating glass pane VIG is produced by this method. For example, when constructing a solar thermal module, an absorber is included in the region of the vacuum between the top pane and the bottom part. This absorber is then provided with supporting elements, which assume the function of the supports described here, so that the type of supports and method of setting the supports that are described here do not come into effect there.

The sequence described above after the washing machine, from providing the mounts to setting the supports, proceeded under clean conditions or in a clean room, but substantially in a normal atmosphere. The next steps are then carried out in a vacuum or a high vacuum.

In preparation, for example, the lower pane 1, connected to the magnetic shuttle plate 46 and having the supports 19, and the upper pane 22 are placed onto a displacing shuttle 57, for example one behind the other, and thus moved in tandem into a vacuum prechamber 59. Then evacuation is performed there to <1 mbar and the airlock 63 to the main chamber 60, which is under a high vacuum of <10−4 mbar, is opened. While this tandem is then being moved into the main chamber 60 through the opened airlock 63 by the transporting means 58, plasma sputter from above 61 and below 62 clean and dry the surface of the glass panes 1 and 22 free of adhering remains, for example by "blasting" with charged argon. Under bombardment with, for example, Ar ions at a bias voltage of >1000 V, the ions can be accelerated out with an electrical field in a partial discharge with a directed ion source or by a discharge with high-frequency ignition. The energy thereby produced of >1 eV has the effect of removing all water on the surface of the glass pane 1 or 22 in a short time.

In the case shown, the upper sputtering device 61 cleans the lower glass pane 1 with the supports 19 and the lower sputtering device 62 cleans the upper glass pane 22.

Figure 10:
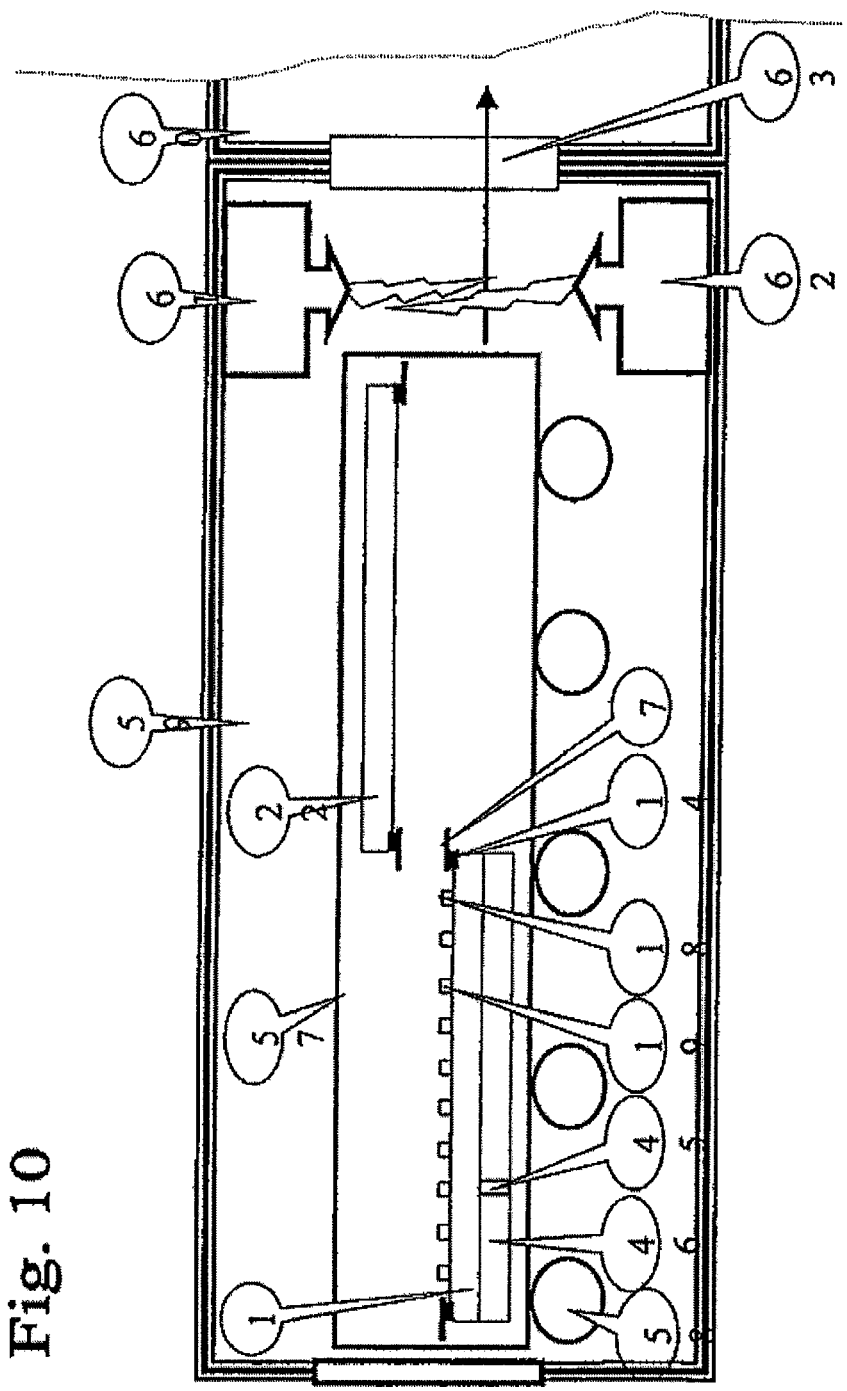
FIG. 10 shows the displacing shuttle during the sputtering in the vacuum line.

FIG. 10 shows the glass panes 1 and 22 on the displacing shuttle 57 in a plasma-sputter cleaning device 17.

Apart from the shuttle transporting device 58 and a metal sealing strip 7, shown from the side, in this representation there can also be seen the solder 14 and the spacers 19 as well as the getter support 18.

During this operation in the vacuum prechamber 59, evacuation continues constantly to less than 10−4 mbar, in order to remove the moisture detached from the panes and the detached contaminants from the vacuum system.

The next step is carried out in the assembly chamber 60 of the vacuum line: the upper pane 22 in the displacing 15 shuttle 57 is positioned over the lower pane 1, lowered and fixed.

Figure 11:
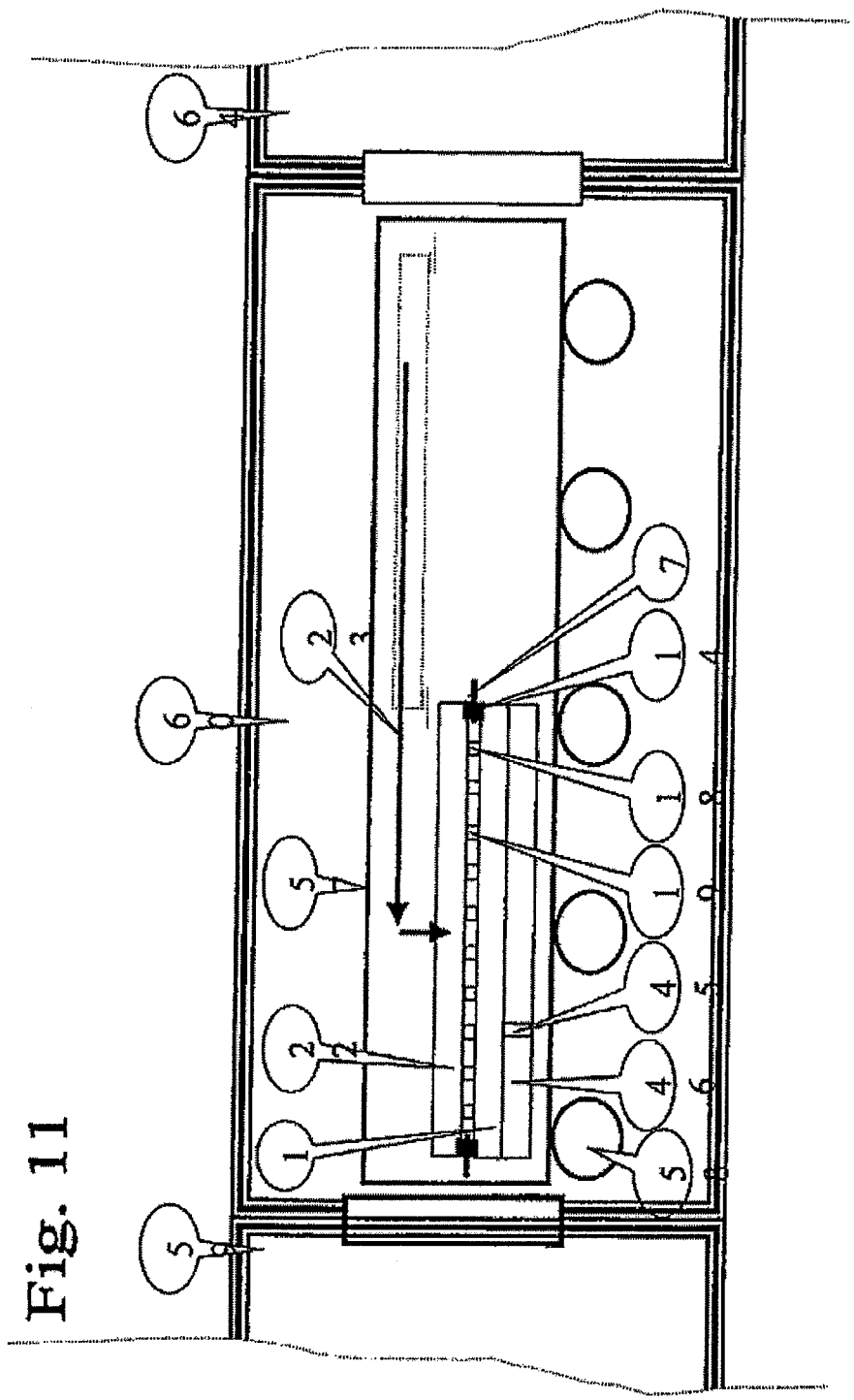
FIG. 11 shows the placing of the top glass in the vacuum line.

In FIG. 11, the placing of a top glass pane 22 onto a glass pane 1 provided with spacers 19 and getter elements 18 is shown. This placement is performed in such a way that a glass pane 22 of dimensions suitable for the glass pane 1, appropriately cleaned and provided with metal sealing strips 7, is taken up in a turned-around form by a mechanical placing device 23 and set down exactly onto the glass pane 1 lying thereunder. The ends of the metal sealing strips 7, to be connected later in a vacuum-tight manner, are pressed flat here, for example, which can be seen from the two sides of the glass panes 1 and 22 lying one on top of the other in cross section. These metal sheets 7 are thereby clamped firmly on one another, in order to eliminate any wave formation and ensure that they lie on top of one another in close contact.

The following step in the assembly chamber 60 permanently connects the two metal mounts 7 of the glass panes 1 and 22 in a high-vacuum-tight manner.

Figure 12:
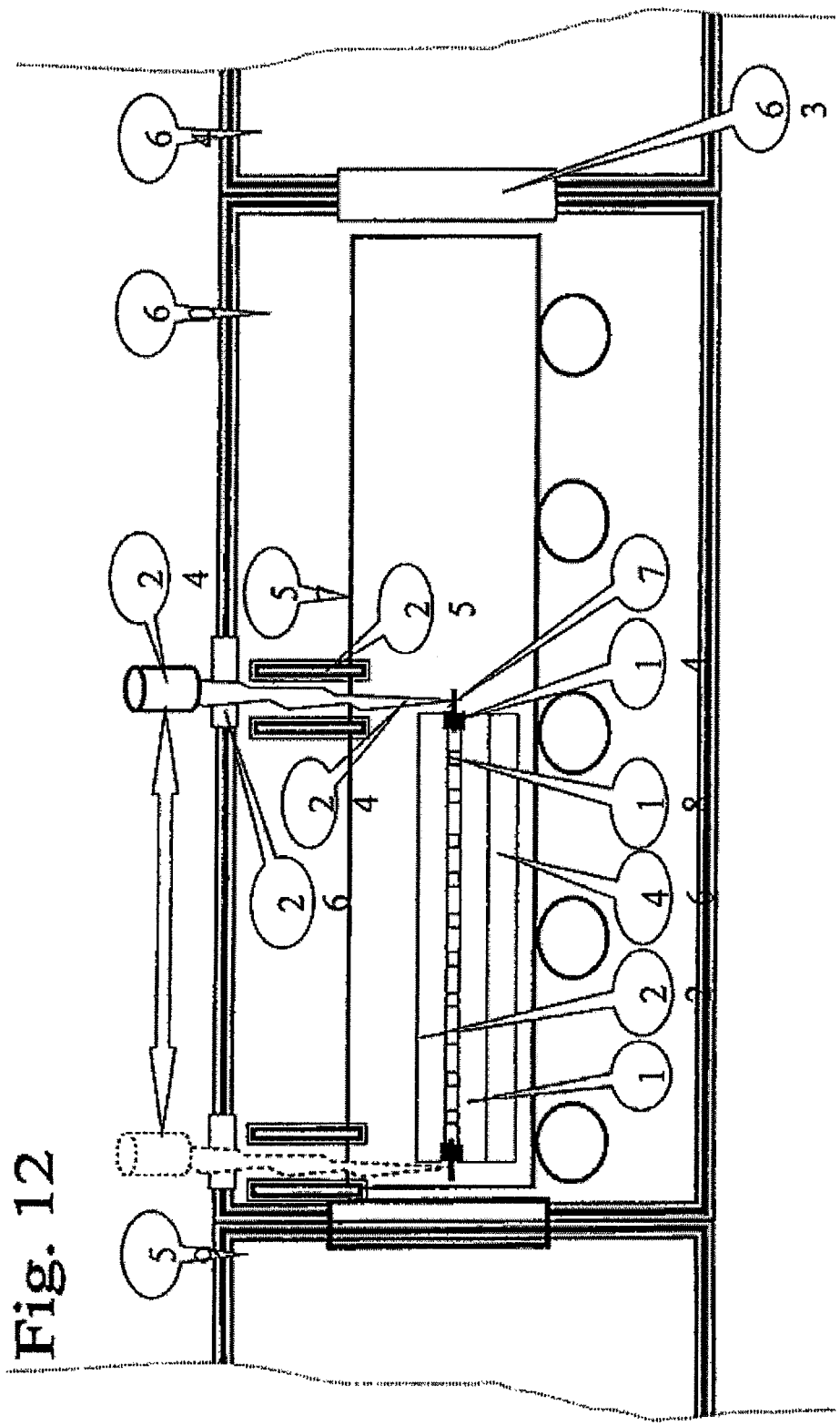
FIG. 12 shows the laser welding device in the vacuum line.

In FIG. 12, the assembly of the glass pane 1 with the top pane 22 in the vacuum assembly chamber 60 is shown.

The vacuum chamber 60 has in the region of the metal sealing strips 7 of the glass pane 1 and the top pane 22 placed one on top of the other in each case a glass window 26, through which a laser welding device 24 guided on the outside by means of an XY positioning device can respectively act.

Special condensate traps 25 in the form of cooled metal sheets and regions that are connected directly to the vacuum pump to achieve pressure differences divert away the outgassing emissions during the welding and help to keep the windows clean for a long time.

As an alternative to the laser welding 24 of the upper and lower mounts, they may also be soldered to one another in a vacuum. For this purpose, it is then necessary, for example, already during the "support setting" step for a soldering tape to be placed all the way around the lower mount and fixed. The fixing unit in the assembly chamber, which presses the two mounts onto one another, then includes a heating device, for example for inductive heating or as an electrical heating wire, etc., whereby the soldering of the two metal strips is carried out.

An entirely different variant for the entire sequence involves constructing not a double vacuum insulating glass pane VIG, but a triple VIG. Here, two glass panes 1 with supports are then placed one on top of the other, with a glass pane 22 in between.

As it passes through the vacuum line, the tandem is then replaced by a displacing frame with three levels. The middle pane without spacers may in this case be configured with or else without a mount.

Once the mounts have then been welded in the assembly chamber, the individual panes have become an almost finished VIG. Inside there is already the vacuum of the assembly chamber of less than 10−4 mbar.

In a next step, the getter 18 must be activated, in order to catch the water and gas molecules that are still hidden in any corners. This takes place by activating the getter, for example by heating, whether by the laser 24, inductive heating, or some other heat source.

At the same time, the VIG pane can then be discharged from the vacuum chamber into the normal atmosphere. This expediently takes place with a VIG pane that is transferred into a downstream discharge chamber 64, under a pre-vacuum, by transporting it further through the intermediate flap 63, in order to save energy and time in maintaining the high vacuum in the assembly chamber. The sealed VIG pane then returns into the normal atmosphere via a further intermediate flap at the outlet of the discharge chamber 64.

The last step serves the purpose of cutting off the metal border, protruding outside the weld seam, of the frames or mounts produced from the metal strips and flanging the remaining metal sheet. Furthermore, the already existing vacuum sealing is additionally protected from the outside against moisture, weathering and mechanical damage by a sealing compound, for example an adhesive, or an encapsulation, for example of plastic.

Figure 13:
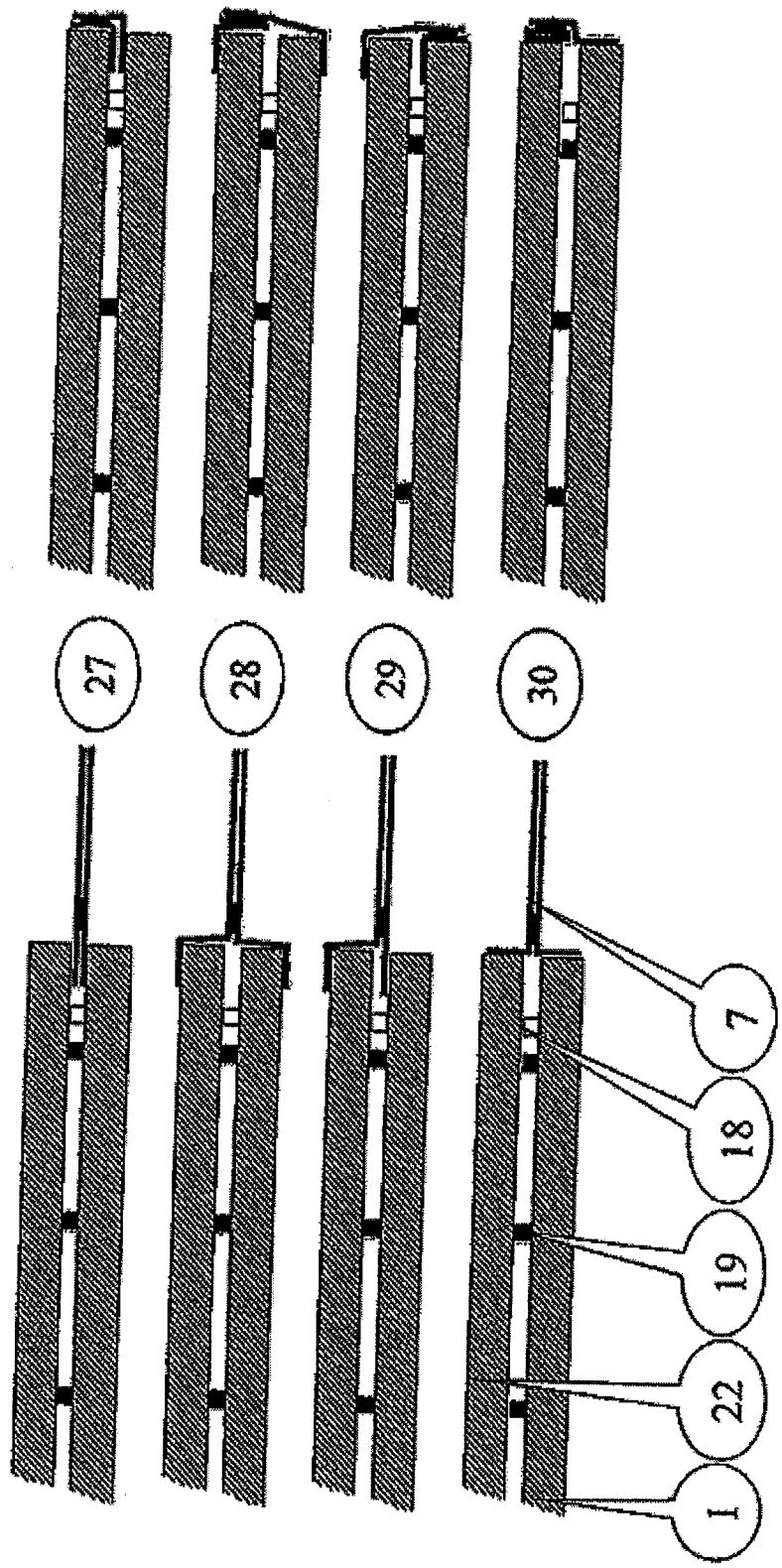
FIG. 13 shows various arrangements of the metal strips before and after the flanging.

FIG. 13 shows the various possible ways of forming the welded-together metal sealing strips 8 onto the finished structural element.

In example 27, the metal strips 7 have been soldered onto the inner side of the glass panes 1 and 22 as 35 described in the above sequence.

In example 28, they have been soldered onto the outer sides. Example 29 is a combination of example 27 and example 28. In the fourth example 30, they have been soldered onto the edge of the glass, as already mentioned and shown in FIG. 4.

In FIG. 15, the situation can be seen on the left before the crimping, on the right after the crimping.

In addition, the high-vacuum-tight sheet-metal frame is then also encapsulated with adhesive and plastic, etc.

Figure 14:
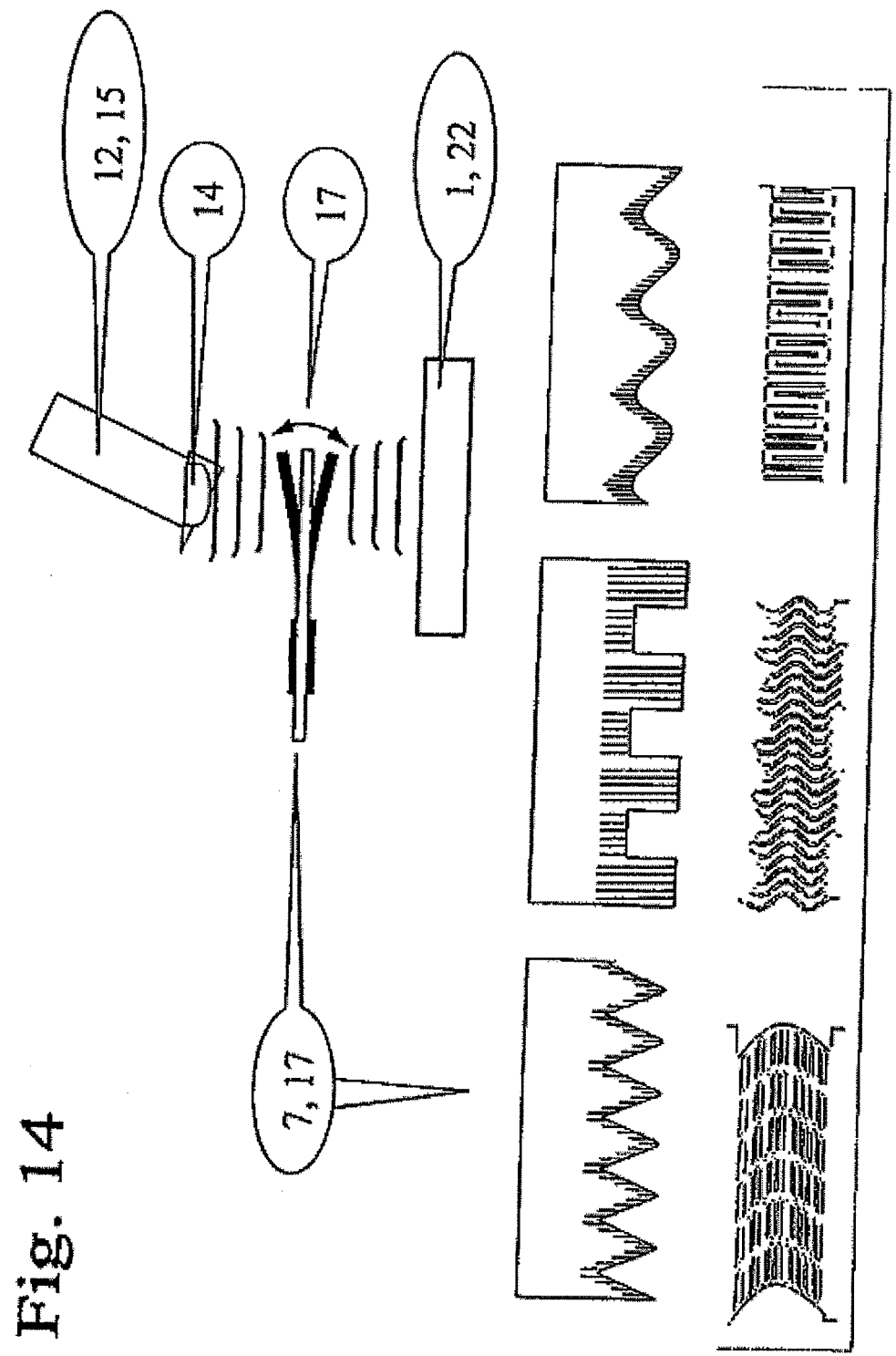
FIG. 14 shows various variants of the tongues on the metal strips for the ultrasonic welding.

In FIG. 14, some examples of the configuration of the lamellae or tongues of the border to be soldered of the metal sealing strips 7 are presented. As already described above, this configuration is required for the vacuum-tight soldering of the sealing strips 7 to the respective glass pane 1 or 22.

In the industrial production of thermally insulating systems by means of the ultrasonic soldered connection according to the invention, the most varied of requirements for the dimensions of such systems can be satisfied. This gives rise to different requirements for the dimensions of the bonding agents and the structure of the respectively structured bonding agent. In addition, the frequency, or the frequency spectrum, of the respective ultrasonic signal can be adapted to the dimensions of the thermally insulating system to be produced.

The complex control of the production processes described requires a special control program.

As a person skilled in the art will readily appreciate, the above description is meant as an illustration of implementation of the principles this application. This description is not intended to limit the scope of this application in that the invention is susceptible to modification, variation and change, without departing from the spirit of this application, as defined in the following claims.

LIST OF DESIGNATIONS

1 Lower glass pane
2 Transporting device
3 Drying device
4 Washing device
5 Heater
6 Heater
7 Metal sealing strips
8 Placing-positioning-fixing device (for metal strips)
9 Soldering table, working support
10 Heating device for the soldering operation
11 Solder supplying device
12 Ultrasonic soldering iron
13 Detecting device
14 Solder
15 Soldering wheel for ultrasonic soldering device
16 Soldering joints
17 Tongue/lamella of the metal strips
18 Getter element
19 Spacer/support
20 Spacer profile punch
21 Spacer adhesion coating application
22 Top glass pane
23 Placing device for top glass
24 Laser welding device
25 Condensate traps
26 Glass window of the vacuum chamber
27 Example: both metal strips soldered on on the inside
28 Example: both metal strips soldered on on the outside
29 Example: one metal strip soldered on on the inside, the other on the outside
30 Example: both metal strips soldered on at the edge
40 "Solder metal strips onto glass surface" variant
41 "Solder metal strips onto glass edge" variant
42 Glass solder
43 Hexagonal setting pattern of the spacers
44 Irregular variation of the hexagonal pattern
45 Fixing elements/magnets in the shuttle magnetic plate
46 Shuttle magnetic plate
47 Force lines
48 Intended placement point for the spacers
49 "Punched spacers" variant
50 "Pieces of wire as spacers" variant
51 Setting device for the spacers
52 Metal sheet coil for spacers
53 Punch for spacers
54 Wire coil for spacers
55 Severing device for spacers
56 Surface treatment of spacers
57 Displacing shuttle vacuum line
58 Transport during sputtering
59 Prechamber of vacuum line
60 Main chamber/assembly chamber of vacuum line
61 Upper plasma sputter
62 Lower plasma sputter

The invention claimed is:

1. An apparatus for producing a flat, thermally insulating structural element from substrates, which, spaced apart at a small distance from one another, are connected to one another at the borders of their periphery by applied pieces, and are insulated from one another by means of a vacuum, comprising the following features:
   a washing device and a following drying device for pre-cleaning the substrates,
   a heating device for preheating the substrates,
   an applied piece positioning device having articulated connections and a pick up mechanism for positioning and placing the applied pieces onto the substrates,
   an ultrasonic soldering device, which solders the applied pieces placed onto the substrates in a vacuum-tight manner along the periphery,
   an automatic spacer and getter setting unit for placing spacers and getter elements onto a first substrate of the substrates,
   a shuttle plate having a plurality of fixing elements arranged in a pattern, wherein the shuttle plate is oriented generally horizontally to support the first substrate during placement of the spacers,
   a plasma sputtering device located within at least one vacuum chamber for cleaning the inner side of the substrates in a vacuum,
   a substrate-displacing device located at least partially within the at least one vacuum chamber for transporting the first substrate and a second substrate of the substrates to a vacuum chamber
   a mechanical substrate-placing device located within the at least one vacuum chamber for joining together the first substrate and the second substrate in a vacuum, the substrates having been provided with the applied pieces and the spacers and the getter elements, and
   a connecting device for welding or soldering applied piece of the first substrate to applied piece of the second substrate in a vacuum chamber.

2. The apparatus of claim 1, wherein the fixing elements comprise magnets.

3. The apparatus of claim 2, wherein the magnets comprise bar magnets or electromagnets.

4. The apparatus of claim 2, wherein the magnets comprise axially magnetized cylindrical bar magnets.

5. The apparatus of claim 1, wherein the fixing elements are disposed in the shuttle plate below the automatic spacer and getter setting unit.

6. The apparatus of claim 1, wherein the pattern is a two-dimensional square grating or grid.

7. The apparatus of claim 1, wherein the pattern is a two-dimensional hexagonal grating.

8. The apparatus of claim 1, wherein the pattern includes non-uniform spacing.

9. The apparatus of claim 1, wherein the fixing elements do not require adhesive.

10. The apparatus of claim 1, wherein the automatic spacer and getter setting unit includes a punch for punching spacers from a roll of metal strip.

11. The apparatus of claim 1, wherein the automatic spacer and getter setting unit includes a saw or cut-off wheel for cutting supports from a roll of wire.

12. The apparatus of claim 1, wherein the substrate-transporting device has a first direction of transportation.

13. The apparatus of claim 12, wherein the border heaters are moveable in a second direction that is transverse to the first direction of transportation.

14. The apparatus of claim 12, wherein the border heaters are located above the susbtrate-transporting device and the central heaters are located below the substrate-transporting device.

15. The apparatus of claim 1 further comprising a shuttle plate having a plurality of fixing elements arranged in a pattern, wherein the shuttle plate is configured to support the first substrate during placement of the spacers.

16. An apparatus for producing a flat, thermally insulating structural element from substrates, which, spaced apart at a small distance from one another, are connected to one another at the borders of their periphery by applied pieces, and are insulated from one another by means of a vacuum, comprising the following features:
 a first vacuum chamber having a first airlock and a second airlock, wherein the first airlock is openable to a normal atmosphere area;
 a second vacuum chamber connected to the first vacuum chamber via the second airlock;
 a substrate-transporting device configured to support and transport the substrates generally horizontally,
 a washing device and a following drying device, each located in the normal atmosphere area, for precleaning the substrates,
 a heating device located in the normal atmosphere area for preheating the substrates, the heating device comprising a border heater and a central heater, wherein the border heater heats the border of the substrates to a first temperature and the central heater heats the substrates to a second temperature that is lower than the first temperature, wherein the border heater and central heater are each arranged adjacent the substrate-transporting device,
 an applied piece positioning device, located in the normal atmosphere area, having articulated connections and a pick up mechanism for positioning and placing the applied pieces onto the substrates,
 an ultrasonic soldering device, located in the normal atmosphere area, which solders the applied pieces placed onto the substrates in a vacuum-tight manner along the periphery,
 an automatic spacer and getter setting unit located in the normal atmosphere area for placing spacers and getter elements onto a first substrate of the substrates,
 a shuttle plate, located in the normal atmosphere area, having a plurality of fixing elements arranged in a pattern, wherein the shuttle plate is oriented horizontally and is configured to support the first substrate during placement of the spacers,
 a plasma sputtering device, located in the first vacuum chamber, for cleaning the inner side of the substrates in a vacuum,
 a substrate displacing device located at least partially within the first vacuum chamber for transporting the first substrate and a second substrate of the substrates to the first vacuum chamber
 a mechanical substrate placing device, located within the second vacuum chamber for joining together the first substrate and the second substrate in a vacuum, the substrates having been provided with the applied pieces and the spacers and the getter elements, and
 a connecting device for welding or soldering applied piece of the first substrate to applied piece of the second substrate in a vacuum chamber.

17. The apparatus of claim 16, wherein the second vacuum chamber includes a glass window, and the connecting device comprises a laser welding device located in the normal atmosphere area and adjacent the glass window.

18. The apparatus of claim 16, further comprising a discharge chamber connected to the second vacuum chamber via a third airlock, the discharge chamber having a fourth airlock openable to the normal atmosphere area.

* * * * *